(12) United States Patent
Liebman et al.

(10) Patent No.: US 12,330,111 B2
(45) Date of Patent: Jun. 17, 2025

(54) MODULAR STRUCTURES TO CONTAIN STRUCTURED SORBENT MATERIALS FOR GAS SEPARATION PROCESSES

(71) Applicant: CARBON CAPTURE INC., Los Angeles, CA (US)

(72) Inventors: Noah Liebman, Los Angeles, CA (US); Brian Holman, Pasadena, CA (US)

(73) Assignee: CARBON CAPTURE INC., Los Angeles, CA (US)

( * ) Notice: Subject to any disclaimer, the term of this patent is extended or adjusted under 35 U.S.C. 154(b) by 0 days.

(21) Appl. No.: 18/326,566

(22) Filed: May 31, 2023

(65) Prior Publication Data
US 2023/0390691 A1 Dec. 7, 2023

Related U.S. Application Data

(60) Provisional application No. 63/347,342, filed on May 31, 2022.

(51) Int. Cl.
*B01D 53/02* (2006.01)
*B01D 53/04* (2006.01)

(52) U.S. Cl.
CPC .... *B01D 53/0407* (2013.01); *B01D 2257/504* (2013.01); *B01D 2258/06* (2013.01); *B01D 2259/4009* (2013.01)

(58) Field of Classification Search
CPC .......... B01D 2257/504; B01D 2258/06; B01D 2259/4009; B01D 53/0407; B01D 53/0462; Y02C 20/40
See application file for complete search history.

(56) References Cited

U.S. PATENT DOCUMENTS

| | | | | |
|---|---|---|---|---|
| 3,964,890 A | * | 6/1976 | Bonn | ........................ G21F 9/02 376/314 |
| 4,026,680 A | * | 5/1977 | Collins | ............... C01B 21/0466 95/99 |
| 4,685,938 A | * | 8/1987 | Oliker | ................ B01D 53/0454 95/25 |

(Continued)

FOREIGN PATENT DOCUMENTS

| CN | 111290049 A | 6/2020 |
|---|---|---|
| CN | 215583474 U | 1/2022 |

(Continued)

*Primary Examiner* — Christopher P Jones
(74) *Attorney, Agent, or Firm* — RAPHAEL BELLUM PLLC

(57) ABSTRACT

A modular structure accommodating structured sorbent in a parallel plate arrangement for the separation of gases, such as the removal of $CO_2$ from air in a direct air capture process is provided. The modular structure includes individual units which act as support structures for the sorbent, and the individual units can be assembled into a larger bed of arbitrary dimensions. The sorbent includes parallel plates through which fluid can flow in many directions (at least two perpendicular directions), with additional features in the support structure that mitigate bypassing effects and reduce parasitic thermal mass. A method for integrating sensors into the bed to understand the performance of the bed in gas separation while minimizing damage to the structure or disruption to performance is also provided.

18 Claims, 14 Drawing Sheets

1. Plate side walls of sorbent support structure or tray
2. Structural support rods perpendicular to wall
3. Parallel plate sorbent

(56) References Cited

U.S. PATENT DOCUMENTS

| | | | | |
|---|---|---|---|---|
| 4,801,308 A | * | 1/1989 | Keefer | B01D 53/0407 |
| | | | | 95/138 |
| 6,969,495 B1 | * | 11/2005 | Hotier | B01J 8/0492 |
| | | | | 261/114.5 |
| 8,999,279 B2 | | 4/2015 | Wright | |
| 9,854,906 B1 | | 1/2018 | Ke | |
| 11,766,636 B1 | * | 9/2023 | Besarati | B01D 53/0476 |
| | | | | 95/90 |
| 2011/0146487 A1 | * | 6/2011 | Celik | B01D 53/0407 |
| | | | | 96/121 |
| 2011/0146494 A1 | * | 6/2011 | Desai | B01D 53/0415 |
| | | | | 96/132 |
| 2012/0076711 A1 | | 3/2012 | Gebald | |
| 2014/0060322 A1 | | 3/2014 | Wanni | |
| 2016/0009614 A1 | * | 1/2016 | Laroche | B01J 20/28071 |
| | | | | 585/828 |
| 2017/0087504 A1 | * | 3/2017 | Sundaram | B01J 20/34 |
| 2017/0326494 A1 | | 11/2017 | Gebald | |
| 2019/0255480 A1 | * | 8/2019 | Wurzbacher | B01D 53/0462 |
| 2021/0187434 A1 | | 6/2021 | Gebald | |

FOREIGN PATENT DOCUMENTS

| | | |
|---|---|---|
| WO | 2015/091303 A1 | 6/2015 |
| WO | 2021/239747 A1 | 12/2021 |

\* cited by examiner

1. Plate side walls of sorbent support structure or tray
2. Structural support rods perpendicular to wall
3. Parallel plate sorbent

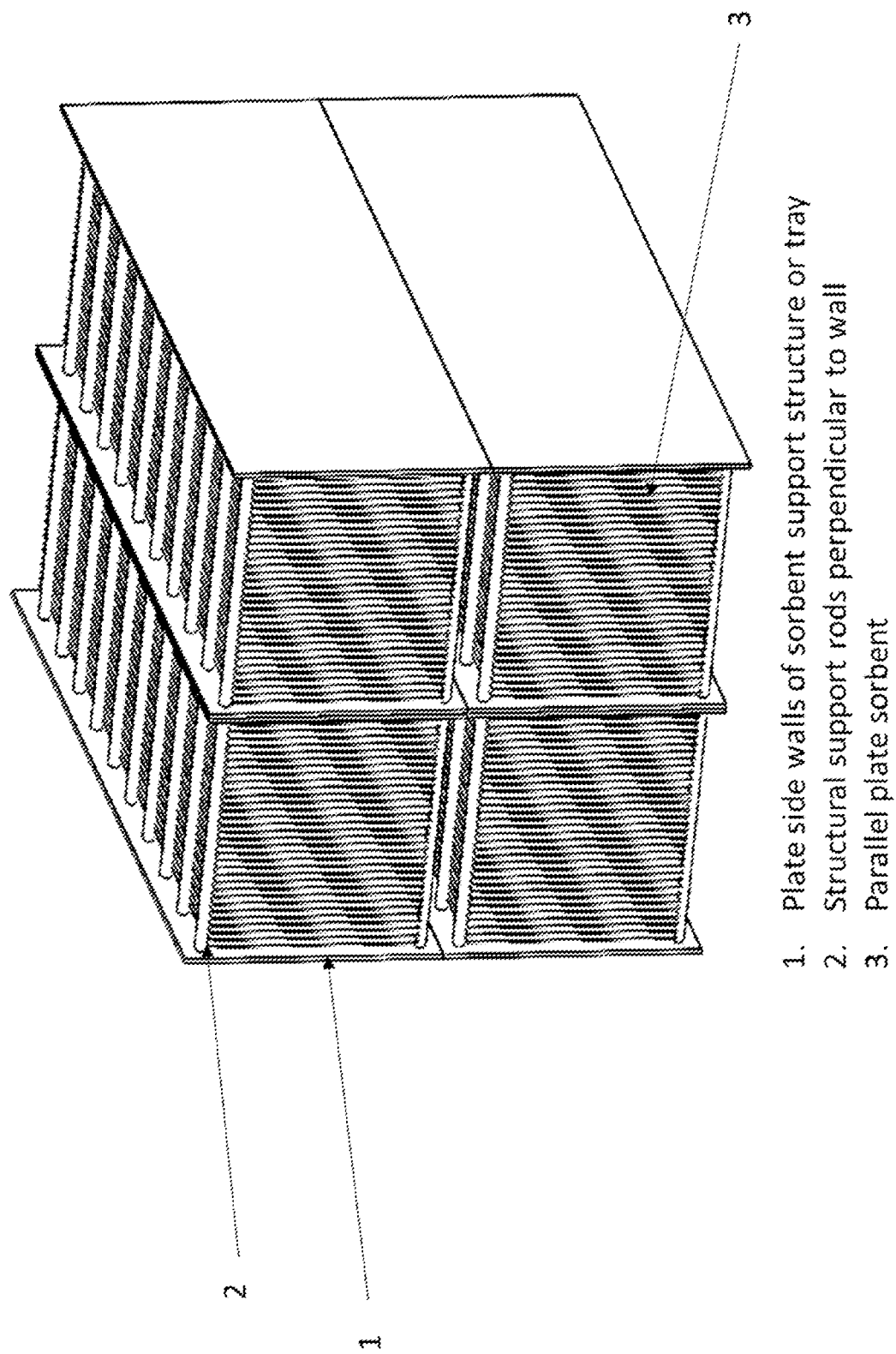

1. Plate side walls of sorbent support structure or tray
3. Parallel plate sorbent
6. Structural support rods at angle to wall 3. Parallel plate sorbent
7. Rod mesh cage sorbent support structure or tray 1. Plate side walls of sorbent support structure or tray
2. Structural support rods perpendicular to wall
3. Parallel plate sorbent
8. Baffles for preventing fluid from bypassing sorbent bed 3. Parallel plate sorbent
9a. Sensor probe passing through sorbent support material
10. Sensor body attached to probe 1. Plate side walls of sorbent support structure or tray
8. Baffles for preventing fluid from bypassing sorbent bed
11. Placeholder for sensor to measure state characteristics of sorbent 3. Parallel plate sorbent
9b. Sensor probe residing in channel between parallel sorbent plates
10. Sensor body attached to probe 3a. Parallel plate sorbent frame
3b. Parallel plate sorbent sheet
9b. Sensor probe residing in channel between parallel sorbent plates
10. Sensor body attached to probe
12. External support feature of parallel plate sorbent frame 3. Parallel plate sorbent
9b. Sensor probe residing in channel between parallel sorbent plates
13. Fins for reducing bypassing of fluid through widened channel 3b. Parallel plate sorbent material
9c. Sensor probe inserted into sorbent material 3b. Parallel plate sorbent material
14. Sensor placed on surface of sorbent material

MODULAR STRUCTURES TO CONTAIN STRUCTURED SORBENT MATERIALS FOR GAS SEPARATION PROCESSES

TECHNICAL FIELD

The invention relates to modular sorbent structures for gas separation processes such as direct air capture of $CO_2$. The structures are designed to contain structured sorbent materials in parallel plate arrangements while allowing for effective gas/fluid flow in at least two different directions.

BACKGROUND

Global warming is posing devastating effects on our climate, health, and communities. Coastal flooding due to rising sea levels, extended wildfire seasons, as well as more destructive hurricanes are the direct impacts of climate change. Moreover, global food and water security are at stake. There is a consensus among scientists that global warming is directly linked to the increase in the level of greenhouse gases in the atmosphere. Carbon dioxide ($CO_2$) is a major greenhouse gas and its concentration in the atmosphere has sharply increased over the past century due to the burning of fossil fuels. Although efforts are underway to move toward renewable energy sources that do not emit greenhouse gases, shifting our energy supply to completely renewable-based is not possible in the near term and requires further technological advancements and significant global investments. Therefore, there is a growing need for technologies that can efficiently capture carbon dioxide from the flue gas of power plants and other industrial processes and, increasingly, even from ambient air. The latter is known as direct air capture (DAC).

A common approach to DAC basically involves a first step of moving ambient air through a bed of a solid sorbent that is effective at selectively capturing a significant portion of the $CO_2$ contained therein. Once the sorbent reaches a level of significant saturation of $CO_2$, it needs to be regenerated in a second step. During regeneration, the sorbent bed is treated with, for example, heat, vacuum, steam, or some combination thereof to cause the $CO_2$ to desorb from the sorbent. The released $CO_2$ is subsequently captured, and the regenerated sorbent can then be returned to the first step and reused to capture more $CO_2$. Due to the low concentrations (currently a little over 400 parts per million) of $CO_2$ in ambient air, high volumes of ambient air need to be moved and processed in a DAC process. Moreover, additional energy is required to regenerate the sorbent, so the system needs to be highly efficient.

Common solid $CO_2$ sorbents include various zeolites or molecular sieves; amine-functionalized silicious, inorganic, activated carbon, graphitic, metal organic framework (MOF) or polymeric supports; amine-functionalized carbon, glass, cellulosic, or polymeric fibers; and basic or weakly basic ion exchange resins. In some cases, the solid $CO_2$ sorbents are utilized in powder or pellet form in fluidized bed or packed bed configurations. In the case of packed beds, ambient air flows through a column of the packed sorbent and experiences a significant pressure drop across the column, requiring additional energy to compensate. In other cases, the solid $CO_2$ sorbents are utilized in fibrous webs, mats, or woven fabrics through which air is passed. In still other cases, the solid $CO_2$ sorbents are formed into structured monoliths or other structured forms such as sheets, films, membranes, or plates through or around which air may be passed.

Other structured sorbent beds, whether modular or not, and whether the sorbent consists of monoliths, parallel plates, or packed beds, typically experience fluid flow in one direction only. In the case of solid $CO_2$ sorbents such as amine-functionalized sorbents where both air and steam are flowed through the material during a carbon capture process for example, this leads to issues where the steam injection concepts must utilize the same flow path as the air, which reduces the range and effectiveness of steam injection concepts that can be deployed. Furthermore, current concepts for fluid flow through the sorbent cause the fluids to pass through barriers that constitute large thermal masses, leading to heat loss and potentially undesirable phase change as well as excessive pressure drop depending on the fluid and structure. Additionally, currently developed sorbent structures can create channels for fluid to flow through the gaps between the sorbent and the support structure or between elements of the support structure, resulting in fluid bypassing the sorbent bed.

Methods utilizing an array of parallel plate adsorber elements have been demonstrated (for example, see WO 2021/239747 A1) which allow fluid flow in two directions through the sorbent, e.g., allowing air and steam to move through the bed in perpendicular directions. However, limitations in the size and mechanical properties of high-capacity structured sorbents that can be fabricated create significant challenges for scaling such methods to sufficient scale for practical DAC. Furthermore, such methods do not include means of integrating measurement devices directly into the bed, which makes it more challenging to assess evenness of flow distribution or rate of fluid delivery throughout the bed for example without disrupting the structure or performance of the sorbent.

SUMMARY OF THE INVENTION

The present invention relates to a modular structure accommodating structured sorbent in a parallel plate arrangement for the separation of gases, such as the removal of $CO_2$ from air in a direct air capture process. The modular structure includes individual units which act as support structures for the sorbent, and the individual units can be assembled into a larger bed of arbitrary dimensions. The sorbent includes parallel plates through which fluid can flow in many directions (at least two perpendicular directions), with additional features in the support structure that mitigate bypassing effects and reduce parasitic thermal mass. Lastly, the invention includes methods for integrating sensors into the bed to understand the performance of the bed in gas separation while minimizing damage to the structure or disruption to performance.

The systems and methods of the claimed invention provide a modular gas separation tray to accommodate structured sorbent materials for a gas separation process. The tray includes a support structure and a sorbent bed comprising multiple layers of structured sorbent in a parallel plate arrangement, through which fluid flows in at least two perpendicular directions. The tray may further include a set of parallel side wall plates connected by at least one support rod communicatively coupled at a non-orthogonal angle to each of the parallel side wall plates.

The systems and methods of the claimed invention may further include a baffle extending between the parallel side walls to prevent fluid from bypassing the sorbent bed by passing between boundaries of the sorbent bed and the tray or between trays. One or more of the tray, the sorbent plate, the side wall plates, the support rod, and the baffle include a material with a coefficient of thermal expansion (CTE) such that structural gaps that exist at ambient temperatures close upon heating as the at least one of the group of the tray, the sorbent plate, the side wall plates, the support rod, and the baffle expands. Expansion and contraction of the at least one of the group of the tray, the sorbent plate, the side wall plates, the support rod, and the baffle reduces thermal stresses during heating and cooling cycles, while bypassing is still mitigated because structural gaps are closed.

The systems and methods of the claimed invention may further include the parallel plate sorbent extending between the connected parallel side wall plates allow fluid flow in a primary flow direction and a secondary flow direction.

The systems and methods of the claimed invention may further include an integrated sensor in the sorbent bed to capture performance characteristics where the integrated sensor is supported through a width of the tray and along a length of the sensor.

The systems and methods of the claimed invention may further provide a primary flow direction through a thickness of the sorbent bed and parallel to side wall plates as a front to back direction. The systems and methods of the claimed invention may further provide a secondary flow direction through a width of the sorbent bed and perpendicular to support rods as a top to bottom direction.

The systems and methods of the claimed invention provide for capturing carbon dioxide from ambient air. The method includes moving ambient air through a modular gas separation tray, where the tray includes a support structure and a sorbent bed comprising multiple layers of structured sorbent in a parallel plate arrangement and through which fluid flows in at least two perpendicular directions, to capture a portion of the $CO_2$ in the ambient air; upon reaching a level of saturation of $CO_2$, regenerating the bed of solid sorbent, including treating the sorbent bed with at least one of the group of heat, vacuum, and steam, desorbing the $CO_2$ from the sorbent based on treating the sorbent bed with the at least one of heat, vacuum, and steam to release $CO_2$, and capturing the released $CO_2$; and returning the sorbent to a pre-treatment state, including at least one of the group of cooling the sorbent bed, removing a vacuum from the sorbent bed, adding a vacuum to the sorbent bed, removing steam from the sorbent bed, and adding steam to the sorbent bed.

The systems and methods of the claimed invention provide a method of capturing carbon dioxide from ambient air. The method includes moving ambient air through a bed of a solid sorbent to capture a portion of $CO_2$ in the ambient air; upon reaching a level of saturation of $CO_2$, regenerating the bed of solid sorbent, including: treating the sorbent bed with at least one of the group of heat, vacuum, and steam, desorbing the $CO_2$ from the sorbent based on treating the sorbent bed with the at least one of heat, vacuum, and steam to release $CO_2$, and capturing the released $CO_2$; and returning the sorbent to a pre-treatment state, including at least one of the group of: cooling the sorbent bed, removing a vacuum from the sorbent bed, adding a vacuum to the sorbent bed, removing steam from the sorbent bed, and adding steam to the sorbent bed. The method may further repeat the steps.

BRIEF DESCRIPTION OF THE DRAWINGS

These and other objects, features and attendant advantages of the present invention will be more fully appreciated or become better understood when considered in conjunction with the accompanying drawings, wherein:

FIG. 3 shows the modular sorbent support tray of FIG. 1A or 1B arranged in an array;

DETAILED DESCRIPTION OF THE INVENTION

Figure 1A:
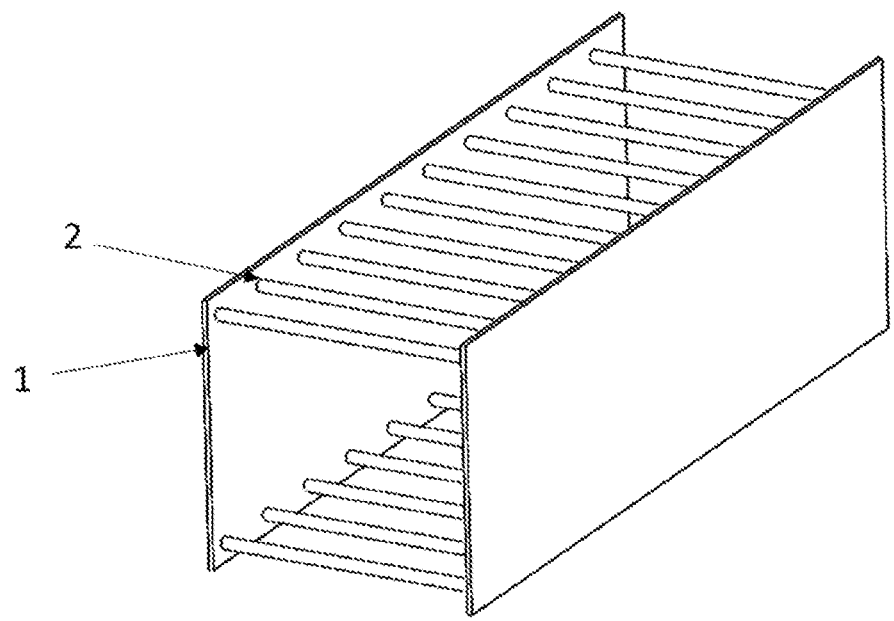
FIG. 1A shows a modular sorbent support tray with structural support rods perpendicular to the side walls.

The present invention utilized a modular structure, sometimes referred to herein as a tray, to contain structured sorbent in a parallel plate arrangement for the separation of gases, such as the removal of $CO_2$ from air in a direct air capture process. The tray consists of individual units which act as support structures for the sorbent, and the individual units can be assembled into a larger bed of arbitrary dimensions. The trays can be designed and sized to optimally support a wide variety of structured sorbents with differing properties such as thickness, strength, stiffness, thermal expansion, etc. A key element of the present invention is its modularity, which as described above allows the bed to be scaled up and down in size by simply stacking repeating units in any combination of directions. One version of such a modular bed consists of individual structures that house sorbent, and these structures can be joined in three perpendicular directions to achieve the desired size and amount of sorbent in the bed. These structures can be of any shape and size and can provide structural support or the sorbent can be self-supporting. The sorbent and support structure can be made of any type of material. The modular bed can also be scaled down to a single unit and need not be composed of repeating units or can be composed of non-homogenous units depending on the application.

Another advantage of the current invention is the parallel plate arrangement of the structured sorbents so that fluid can flow in at least two directions through the sorbent, which allows, for example, air and steam to move through the bed in perpendicular directions. In certain embodiments, these plates have the unique ability to allow fluid flow in any direction in the plane of the plates, while no fluid can flow perpendicular to the plane of the plate. In one iteration of the modular bed, this means the support structures will allow fluid to flow front to back and top to bottom, while no fluid can flow side to side given the orientation of the plates and the design of the corresponding support structure. In other embodiments, these plates may also have the ability to allow fluids, or certain fluids, to flow through the thickness of the plate. The support structure need not allow fluid flow in multiple directions, but multi-directional flow is sometimes preferred. For example, perpendicular fluid injection allows for the implementation of a wider range of steam injection concepts than would be possible if air and steam assumed the same flow path through the sorbent and allows condensation from the steam flow to drain under the influence of gravity without the condensation return equipment at the bottom of the sorbent disrupting the airflow among other benefits. Other advantages of the present invention include: minimization of parasitic thermal mass that the fluids come in contact with, which reduces undesirable phase change and/or heat loss; minimization of the pressure drop experienced by the fluids, which reduces the energy penalty of moving the fluids through the sorbent; and reducing the possibility of fluid bypassing the sorbent, which increases capture efficiency.

Additional aspects of the support structure include minimizing the amount of support structure material that the fluid or fluids come in contact with while flowing through the sorbent. In the case of moving fluids at elevated temperatures through the bed for the purpose of heating the bed, this reduces the amount of heat that is potentially lost from the fluid to the structure and also reduces the ability for the fluid to undesirably change phase as a result of contact with the structure. This in turn reduces the energy penalty of generating, heating, and moving the fluid as well as enhancing the evenness of heating in the bed and decreasing the time it takes for the bed to reach a certain temperature. Regardless of the type or purpose of moving a fluid through the bed, reducing the material that the fluid comes in contact with reduces the pressure drop experienced by the fluid and thus reduces the energy required to move that fluid through the bed. Another advantage of this invention is the support structure also reduces the ability of the fluid to bypass the sorbent, which means that less fluid needs to be moved through the bed to achieve similar levels of heating, $CO_2$ adsorption, etc.

Another set of advantages related to the present invention include effective sensor integration within the sorbent bed. Intentional integration of sensors in the sorbent bed during the design phase reduces the damage or disruption to either the material, support structure, or fluid flow that can be caused by the presence of the sensors in the bed. The present invention includes methods of using the sorbent to protect the sensors from damage, integrating the sensors with the sorbent for more direct measurements, reducing the ability of air to bypass through channels that were created or enlarged to insert the sensor, or allowing the sensor to measure a larger area of the flow. In the case of temperature sensors applied to a sorbent bed for capture of carbon dioxide, evenly distributing them through the bed allows for understanding of evenness and rate of both adsorption of $CO_2$ and heating and cooling of the bed as part of temperature swings for desorption and regeneration. In particular applications, the temperature measurements may also give information relating to the progress of steam heating, evaporative cooling, water cooling, or any number of fluid flow processes that may affect the temperature of the bed. These sensors need not be temperature sensors but can be sensors for any range of measurement, and need not be probes but can be surface sensors, wire leads, etc.

In some embodiments of the present invention, the sorbent material will be a structured sorbent material which allows a high flow of air through the sorbent modules with a low pressure drop. In some embodiments of the present invention, the structured sorbent material may be in the form of sheets or plates supported within the support trays in a parallel fashion. The parallel sheets may comprise sorbents coated onto, impregnated into, embedded in, or held within porous polymeric supports; woven glass, carbon, ceramic, or polymeric fiber fabrics or membranes; or glass, carbon, ceramic, or polymeric fiber felts. In some embodiments of the present invention, the sorbent material may be in the form of a powder, bead, or other particulate form contained within a tubular, disc, sheet, or pleated sheet shaped structure through which air may pass. In some embodiments of the present invention, the structured sorbent material will be in the form of a monolith material with the sorbent coated onto or incorporated into the walls of the supporting monolith material. In some embodiments of the present invention, the structured sorbent material will be in the form of a honeycomb material with the sorbent coated onto or incorporated into the walls of the supporting honeycomb material. In some embodiments of the present invention, the structured sorbent material may be in the form of an open-cell foam or other type of reticulated sheet or structure through which air may flow.

Figure 1B:
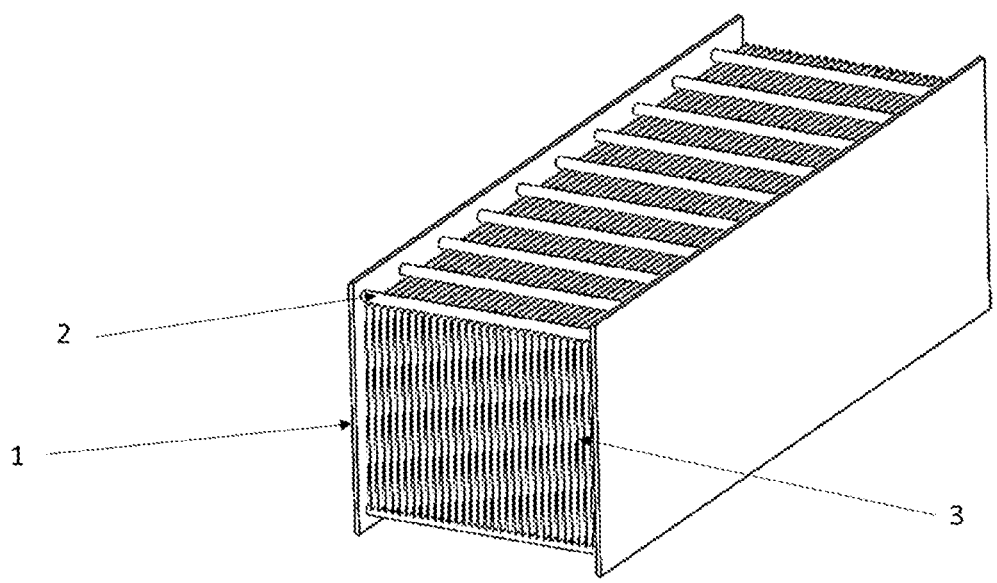
FIG. 1B shows the modular support tray filled with sorbent in a parallel plate form.
Figure 2:
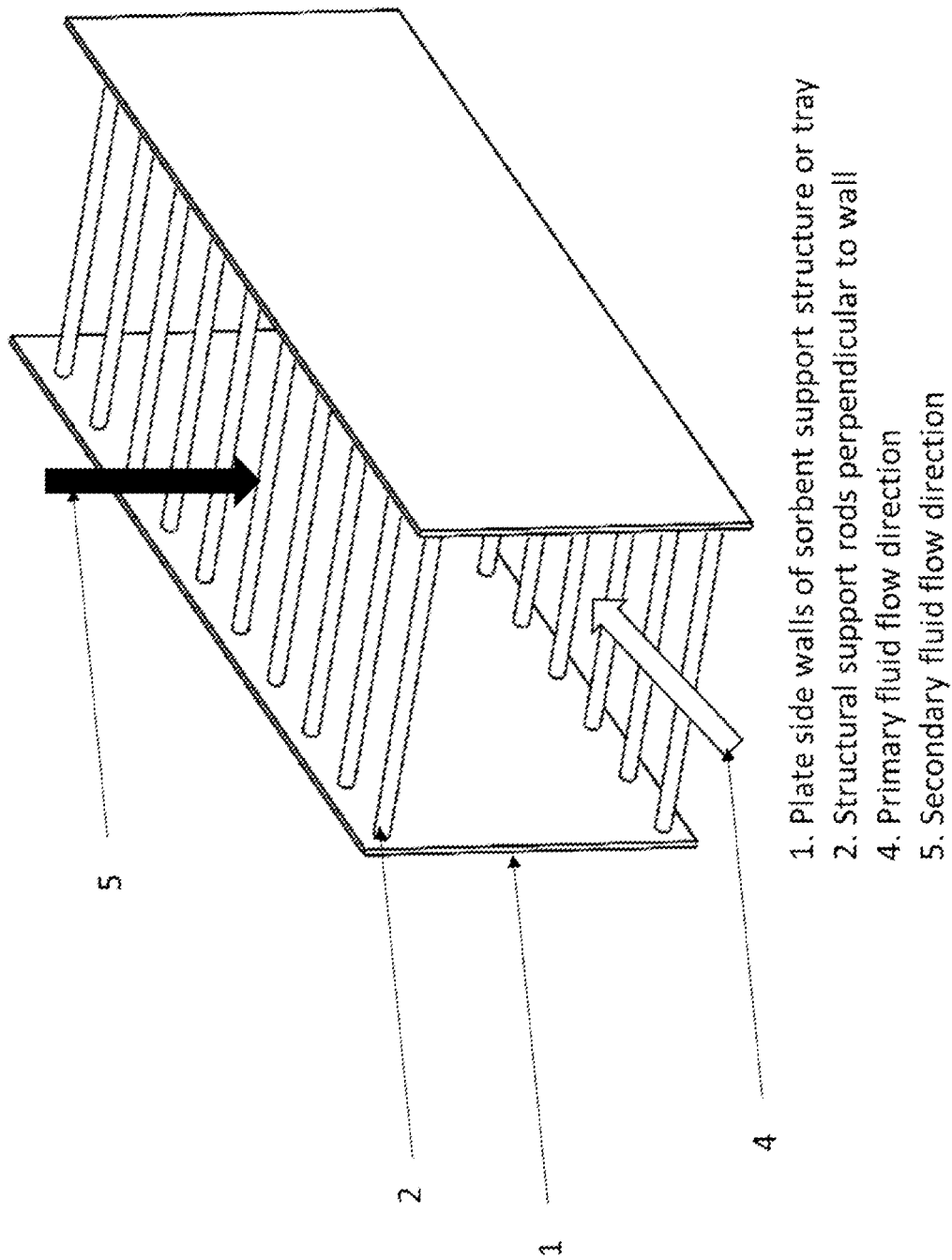
FIG. 2 shows two possible fluid flow directions through the modular sorbent support tray of FIG. 1A or 1B.

One version of a sorbent support tray is shown in FIGS. 1A and 1B and can be formed from parallel side wall plates (1) that are completely solid or optionally perforated. In some embodiments, these side wall plates can be joined with support rods (2) that are perpendicular to the plates, and multiple layers of parallel plate sorbent (3) placed therein, such that fluid can flow through the sorbent along any number of directions including a primary flow direction (4) and a secondary flow direction (5) as depicted in FIG. 2. As shown in FIG. 3, the sorbent support trays may be stacked in an array to create a larger sorbent structure. The array can be of any size, including but not limited to 2×2, 3×3, 4×4, 2×3, 3×2, 2×4, 3×5, 5×3, 5×5, etc. as may be desired for a particular application. In other embodiments, the sorbent support trays may be utilized in a three dimensional (3D) array format, including but not limited to 3×3×2, 3×3×3, 3×5×3, 5×5×3, etc.

Figure 4A:
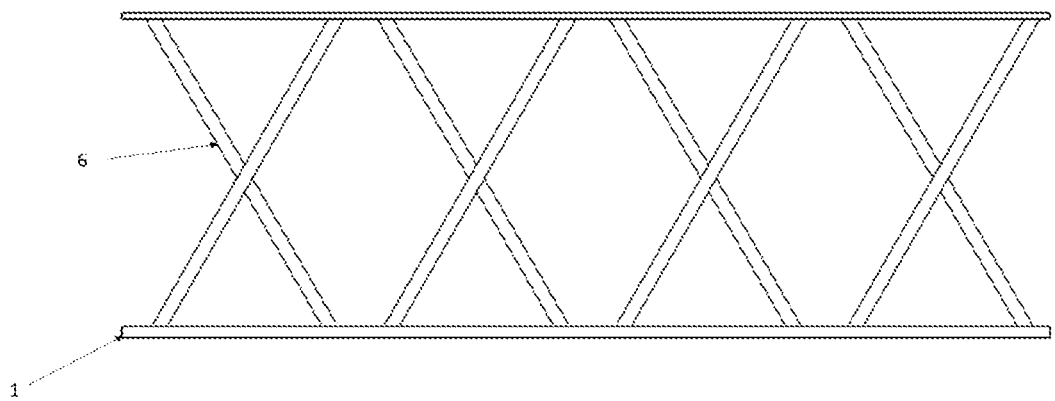
FIG. 4A shows the top view of a modular sorbent support tray with structural support rods angled to the side walls.
Figure 4B:
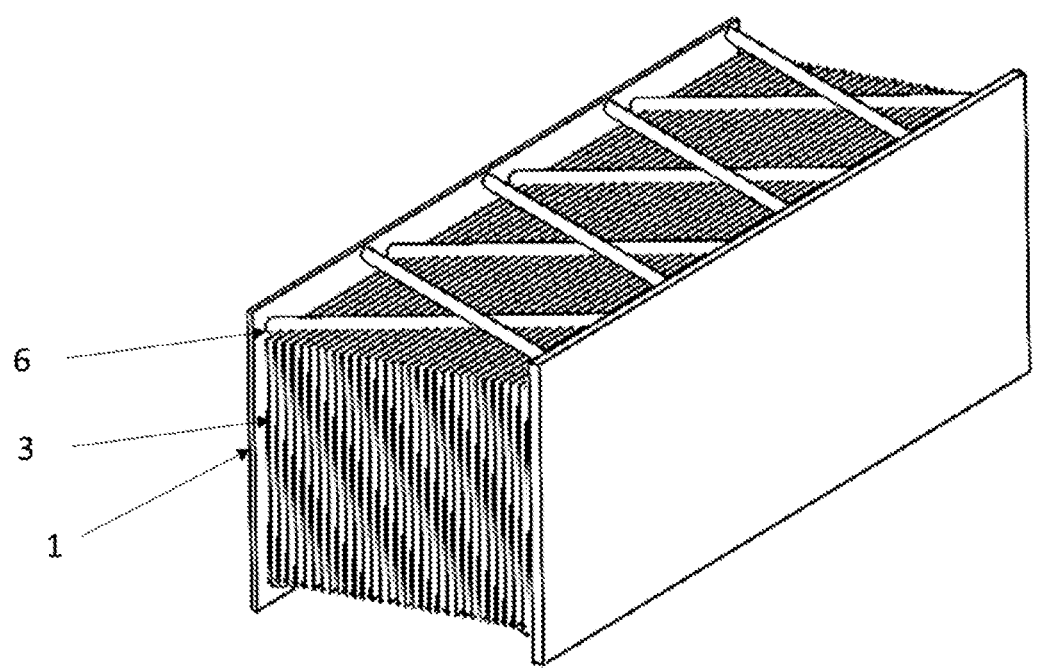
FIG. 4B shows the corresponding modular support tray filled with sorbent in a parallel plate form.

Another version of a sorbent support tray is shown in FIG. 4A or 4B and can be formed from support rods (6) that are oriented at an angle and in a crossover fashion to enhance structural rigidity. The intent of having bars at the bottom as well as the top of the tray is to decrease thermal mass and pressure drop related to fluid flow through the top and bottom of the tray (5) compared to other concepts that use for example a perforated steel plate for the top and/or bottom of the trays. For all these concepts, fluid flow along the tray is completely unobstructed (4). Rod size and count can also be tuned and rods can be placed upstream and downstream of the sorbent from the primary fluid flow direction (4) as well. Any of these rods or plates may or may not be removable to facilitate sorbent insertion and removal from the tray. Rods may also be placed anywhere between the trays or external supports may even be used to keep the trays together or keep the sorbent within the trays.

Figure 5A:
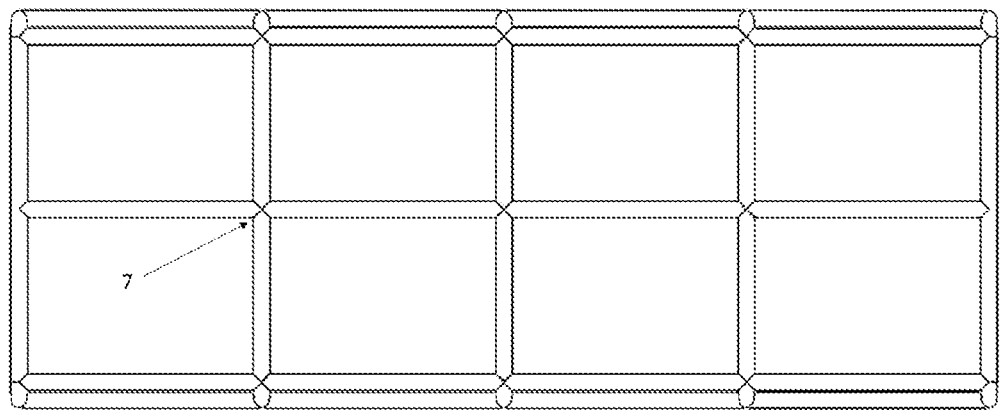
FIG. 5A shows the top view of a modular sorbent support tray in the form of rod mesh cage.
Figure 5B:
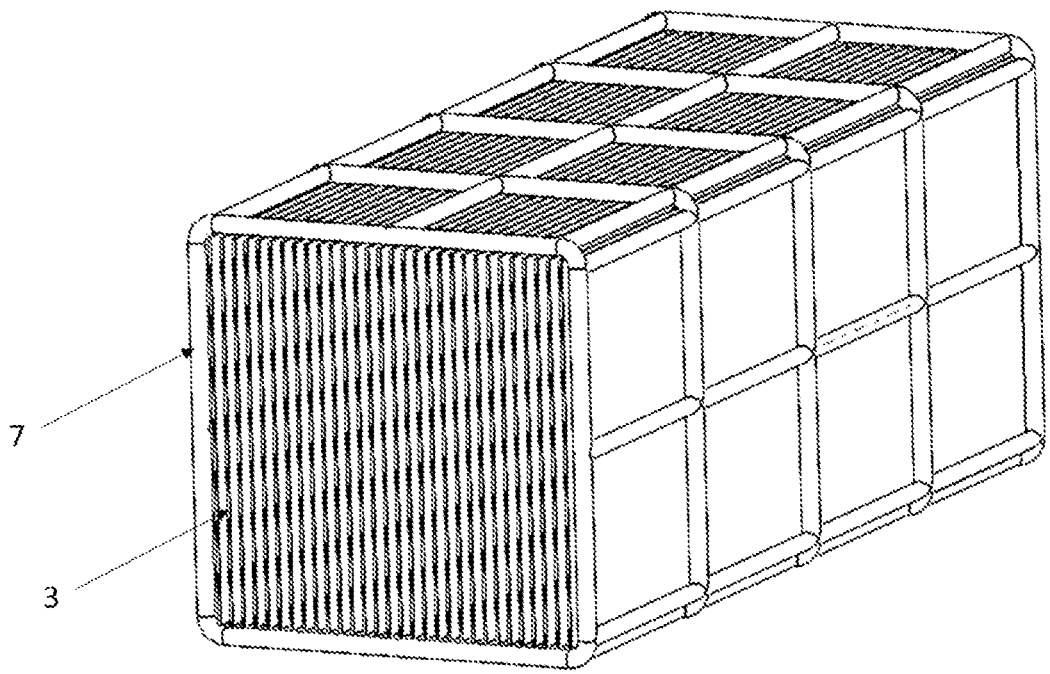
FIG. 5B shows the corresponding modular support tray filled with sorbent in a parallel plate form.

The side wall plates can be replaced by any number of structure elements including corrugated sheets, meshes, etc., while the support rods can be replaced by beams, wires, etc. The side walls can be perforated to reduce mass and cost of the overall structure or could be entirely or partially replaced with a rod mesh (7) to permit fluid flow in all directions (FIG. 5A or 5B). The mesh can consist of similarly sized rods or can have thicker rods serve as the primary structural support interspersed with or adjacent to another mesh with smaller rods to provide distributed support at a lower cost and weight than with thicker rods alone. The mesh can also be oriented at different angles to the direction of flow to optimize rigidity, such as diagonal or +/−45 deg. The mesh may also be composed of wires, woven material, etc.

Figure 6A:
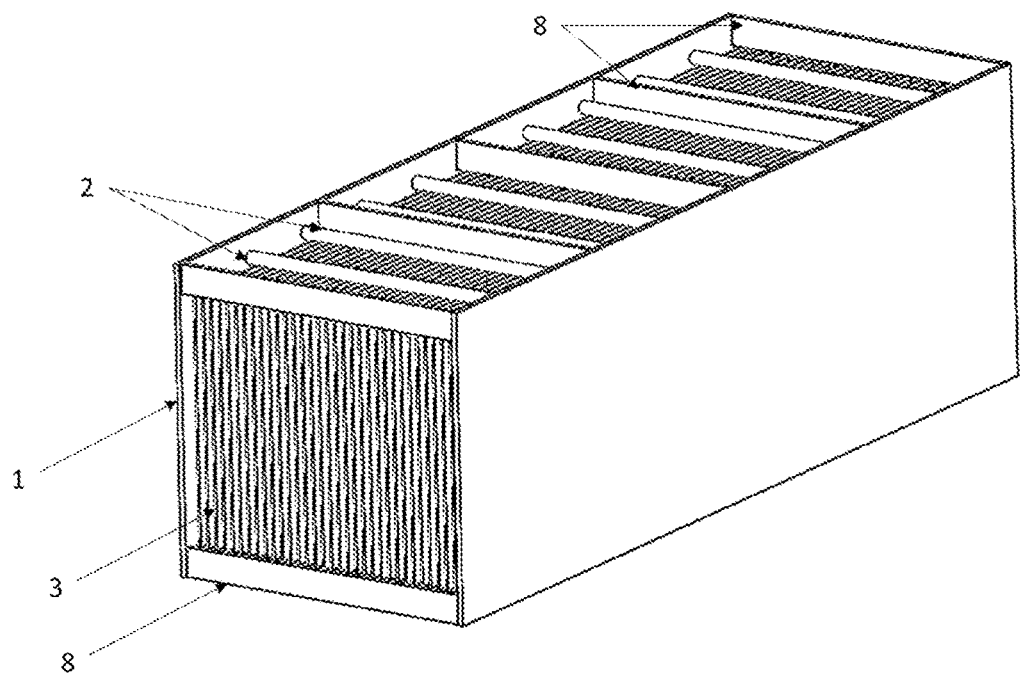
FIG. 6A shows the modular sorbent support tray of FIG. 1A with baffles added to prevent fluid bypassing the bed in the primary flow direction.
Figure 6B:
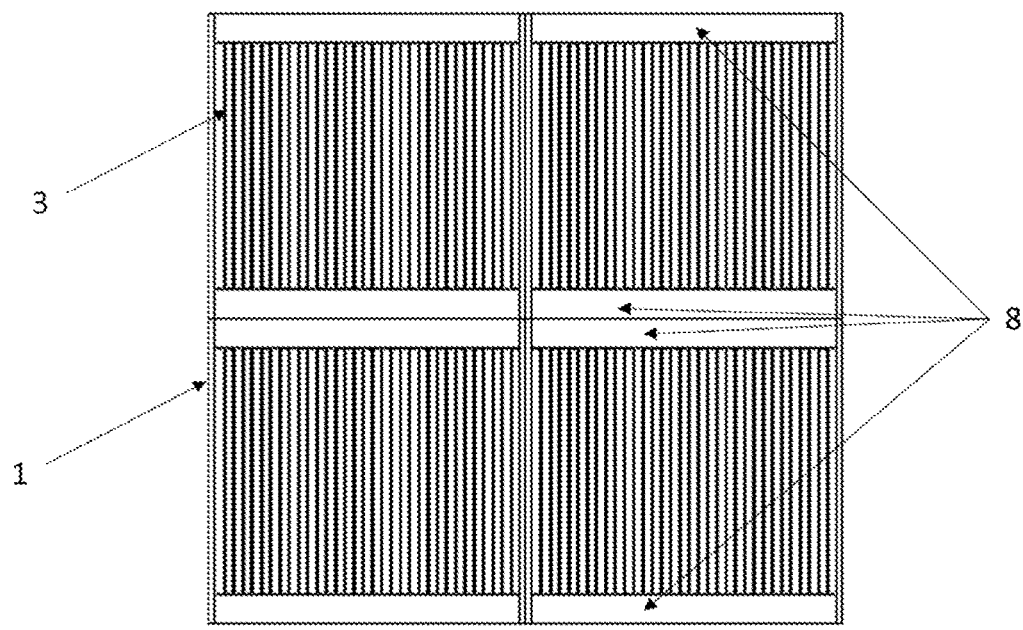
FIG. 6B shows a front view of the corresponding modular support tray with baffles arranged in an array.

For all of the above concepts, and others not mentioned here, baffles (8) may be added to the trays to prevent fluid from bypassing the sorbent bed by passing in between the boundaries of the sorbent and the tray (FIG. 6A or 6B). The operating principle is that there is likely a greater pressure drop for the fluid to exit the bed, turn 180 deg, and reenter the bed than for it to continue along the bed in the original flow direction. The intention is to ensure that the fluid remains in the bed from the point of injection to the point of removal to reduce the chance of local underutilization of the bed. The trays will also be designed such that fluid cannot pass in between the trays. The baffles can also be structural in nature as that they remove the need for separate rods connecting the side walls of the tray. The baffles may use any count or spacing, may completely or partially prevent bypassing, and may be of any shape or size.

The tray, rod, and/or baffle material, or any additional support material, can be made of insulative material, with the intention of preventing heat transfer from the fluid to the support material and maintaining a hot surface to minimize undesirable phase change in the fluid. This material can also be conductive, with the intention of more quickly bringing the support material to the temperature of the fluid so that it can act as a vector for heat distribution to the contacting regions of the sorbent for example. The coefficient of thermal expansion (CTE) of the support material can also be selected such that gaps that exist at ambient temperatures close upon heating as the support material expands. This enabling material expansion and contraction reduces thermal stresses during heating and cooling cycles, while bypassing is still mitigated since gaps are closed.

Figure 7A:
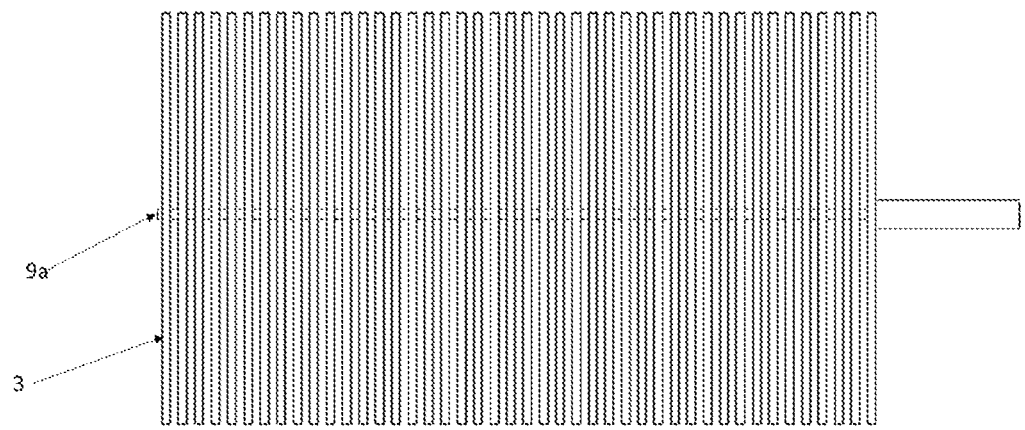
FIG. 7A shows front view of sensor probe integration using sorbent frame to support probe through the width of the tray and along the length of the probe.
Figure 7B:
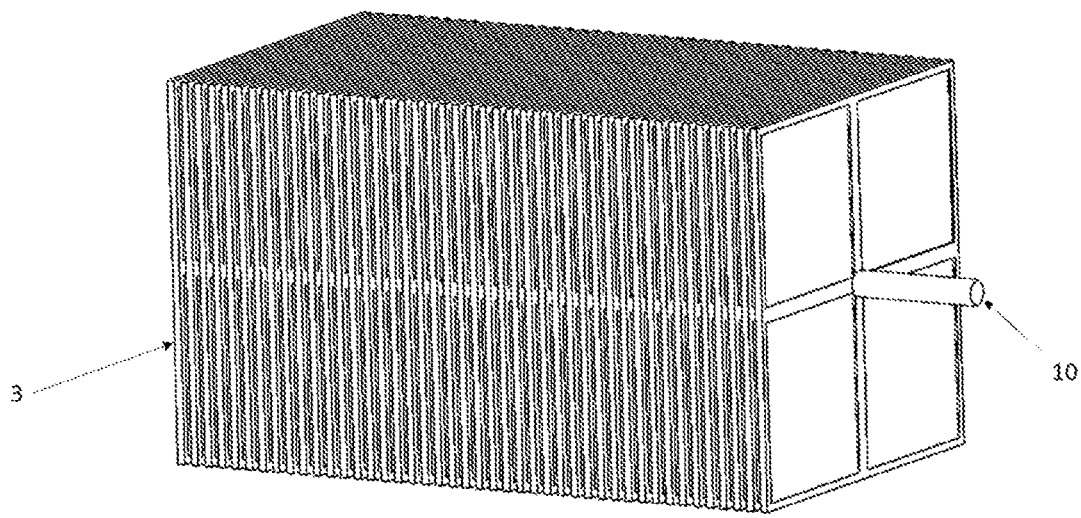
FIG. 7B shows corresponding isometric view showing a sensor body attached to the probe extending through the width of the tray and along the length of the probe.

The present invention also includes methods of integrating sensors, including but not limited to thermocouples, within the structure of the sorbent and trays. The intention of including the sensors in the design of the sorbent and trays is to mitigate any adverse impact the sensors may have on the survivability or performance of the material or support structure. In some embodiments, the sorbent sheets that form the sorbent panels (3) may be joined at structural interfaces. These interfaces can be outfitted with a channel into which a probe can be inserted (9a), supporting its long thin body along its length (FIG. 7A or 7B). This configuration also has the advantage of minimizing disruption of fluid flow in any of the possible directions.

Figure 8A:
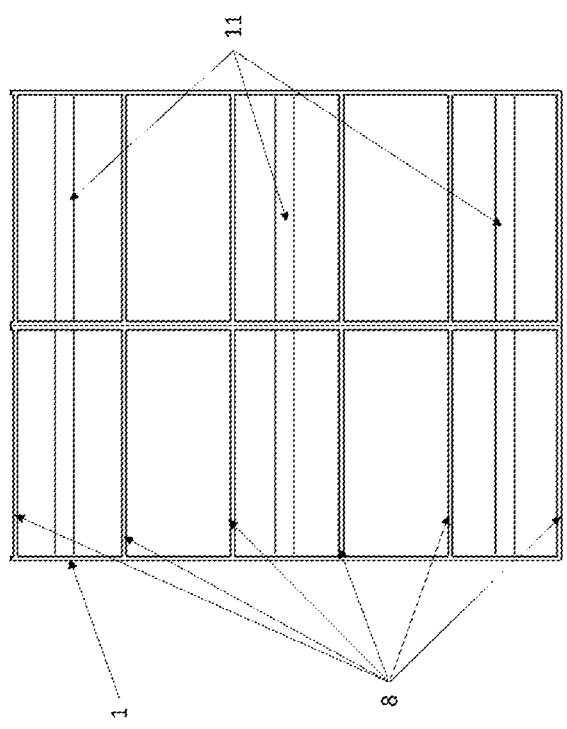
FIG. 8A shows a front view of possible sensor placements within the bed.
Figure 8B:
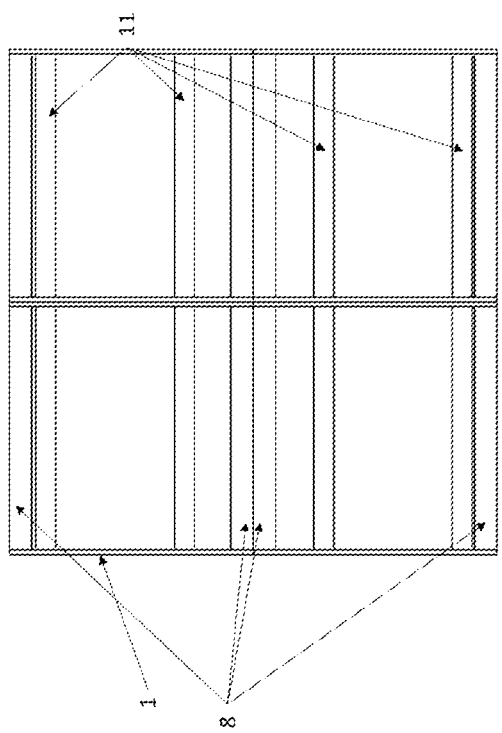
FIG. 8B shows a top view of possible sensor placements within the bed.

Monitoring of temperatures during the adsorption and desorption processes is important in these systems so integrated thermocouples are particularly desirable. These thermocouples can be multi-point thermocouples, so that the individual probe count is reduced while the sensor number and locations can be tuned. In one particular application, air containing $CO_2$ is flowed through the bed, and the thermocouples can detect the heat of adsorption to determine evenness and rate of adsorption in the bed. In a related application, steam is flowed through the bed to heat the bed to cause the sorbent to desorb $CO_2$, and later a vacuum is induced in the chamber to cool the bed via evaporation of the condensed steam, in which case the thermocouples can detect the evenness and rate of heating and cooling. To this end, sensors (11) can be placed throughout the bed, with extra sensors at the upstream and downstream portions of the bed since depending on the fluid type and purpose these are likely to be the hottest and coolest portions of the bed (FIG. 8A or 8B).

Figure 9B:
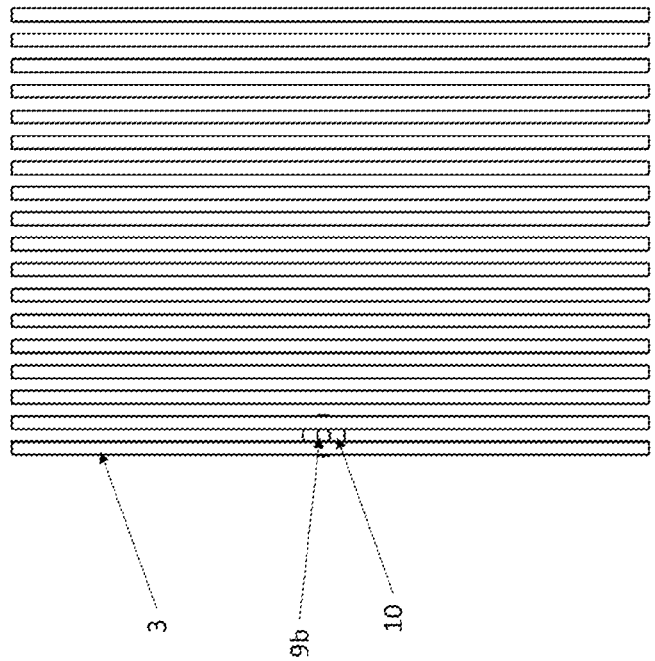
FIG. 9B shows a top view of possible sensor placements within the bed with probe within channels between the sorbent plates.
Figure 9A:
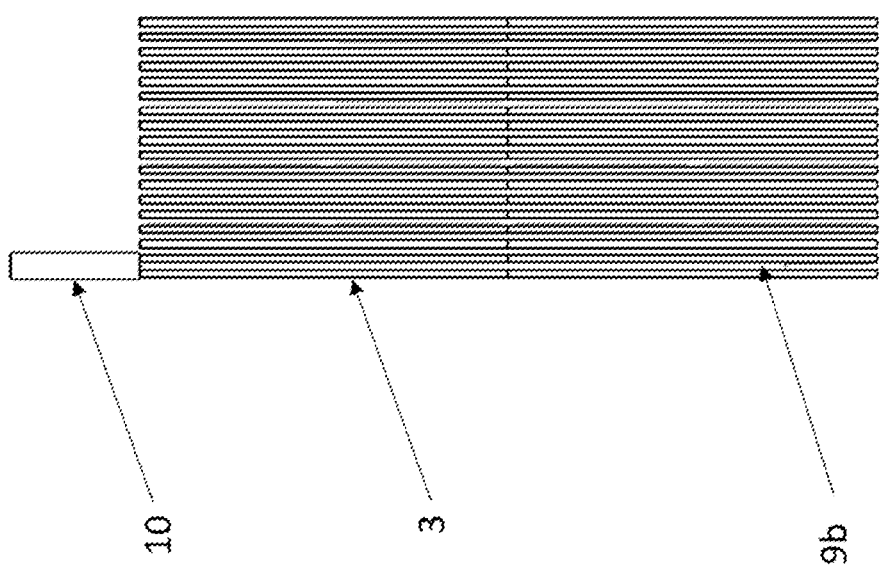
FIG. 9A shows a front view of possible sensor placements within the bed with probe within channels between the sorbent plates.
Figure 10:
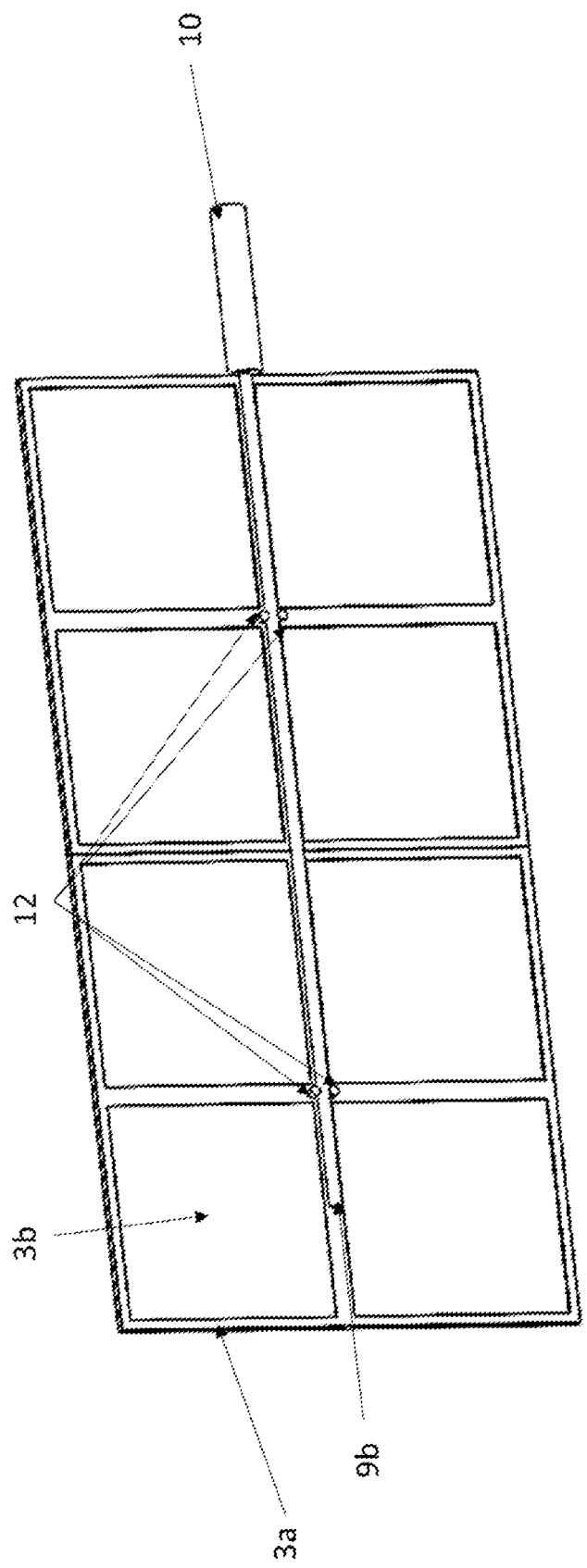
FIG. 10 shows a method of supporting a sensor probe along its length using external features of sorbent frame.

In another embodiment, a sensor probe (9b) may be placed directly inside of a channel between sorbent plates (FIG. 9A or 9B). This may partially obstruct fluid flow in one direction but will leave fluid flow mostly unobstructed in a perpendicular direction. Since many probes have long, thin bodies, which will vibrate when exposed to fluid flow causing sensor degradation over time, the probe ends may be supported by external structural features (12) attached to the support structure (3a) or sorbent material (3b) as shown in FIG. 10. The probe may be oriented in any direction.

Figure 11:
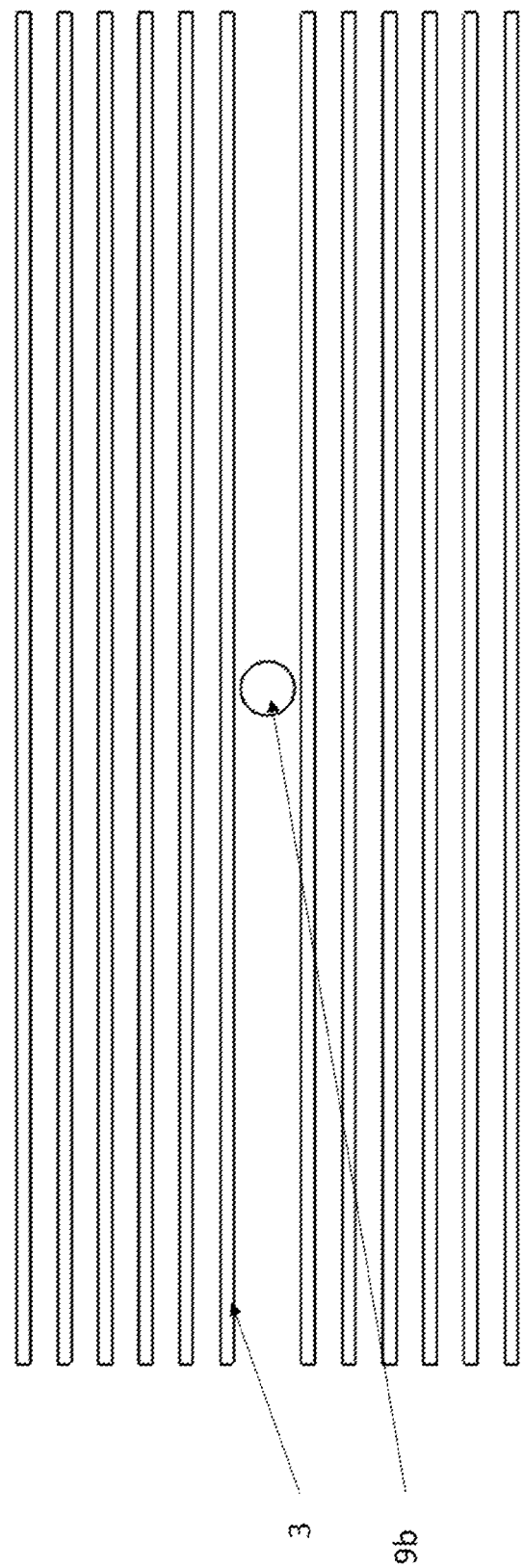
FIG. 11 shows a probe integration approach potentially leading to fluid bypassing portions of the bed via a widened channel.
Figure 12:
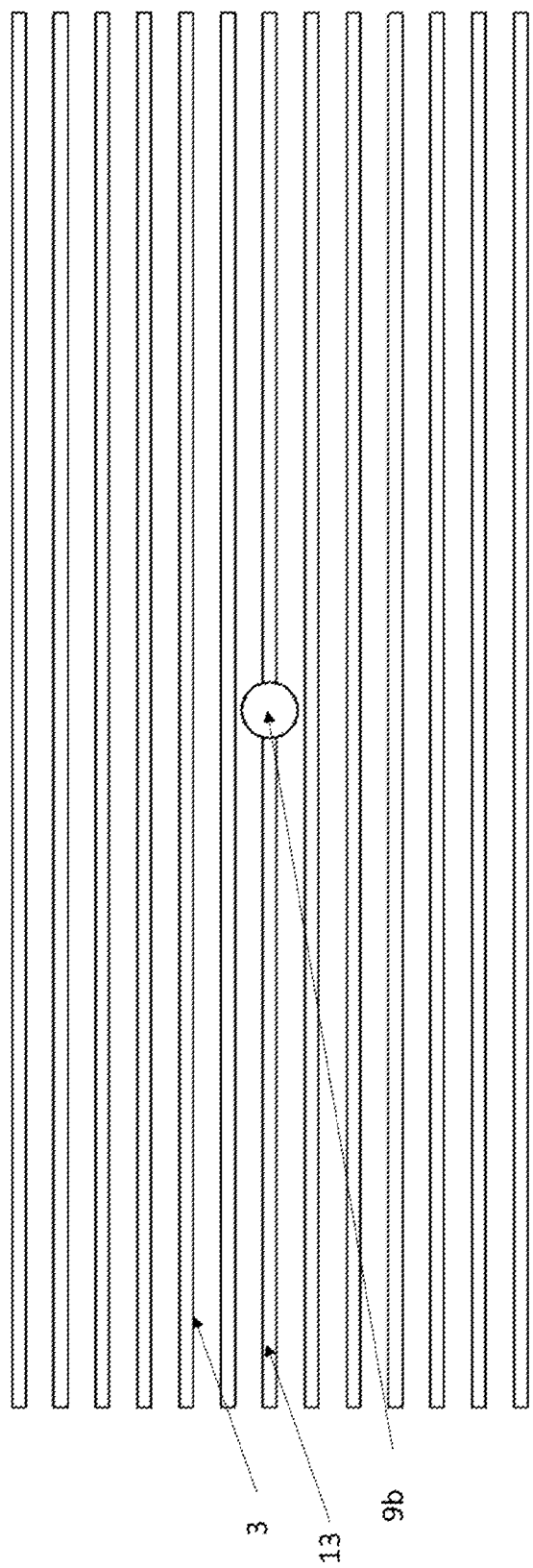
FIG. 12 shows a finned sensor probe to reduce flow bypassing bed via widened channel.

If the channel into which the probe is inserted is expanded to allow the probe to fit as shown in FIG. 11, then air may preferentially flow through the wider channel, leaving the nearby narrower channels with less flow overall. This bypassing effect would lead to uneven flow distribution of the fluid through the bed and also skew local measurements since the fluid flow through the channel with the probe is higher than that of the surrounding bed. To mitigate this, a fin (13) may be attached to the probe to maintain even channel widths across the sorbent bed as shown in FIG. 12. Portions of the fin near the probe can be thermally conductive in order to measure the local temperature over a wider area or can be insulative to ensure the measurement reflects the temperature over a smaller area. The fin material can be any material and the probes can be of any number, size, or length.

Figure 13:
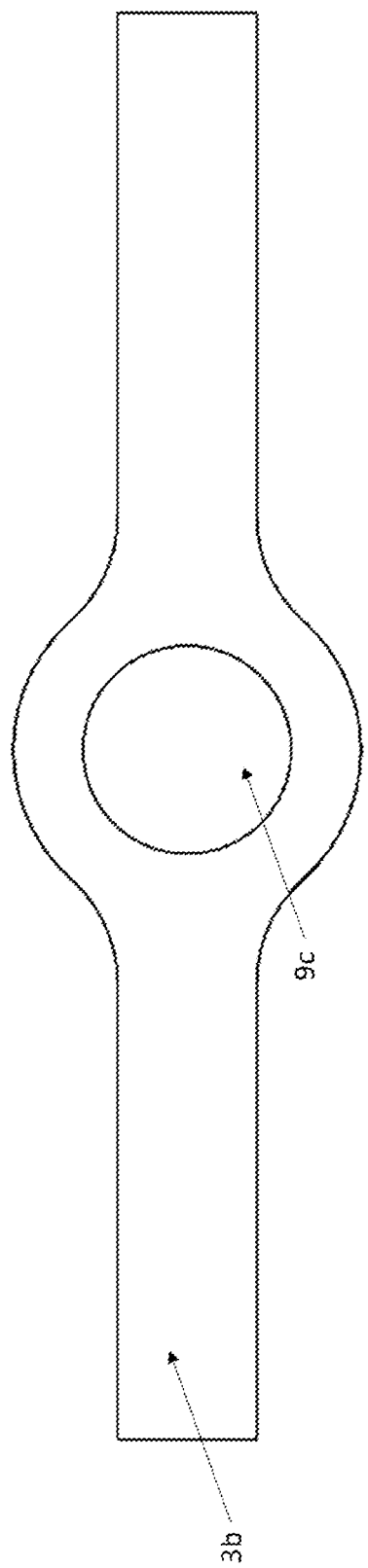
FIG. 13 shows a sensor probe inserted into the sorbent material.
Figure 14:
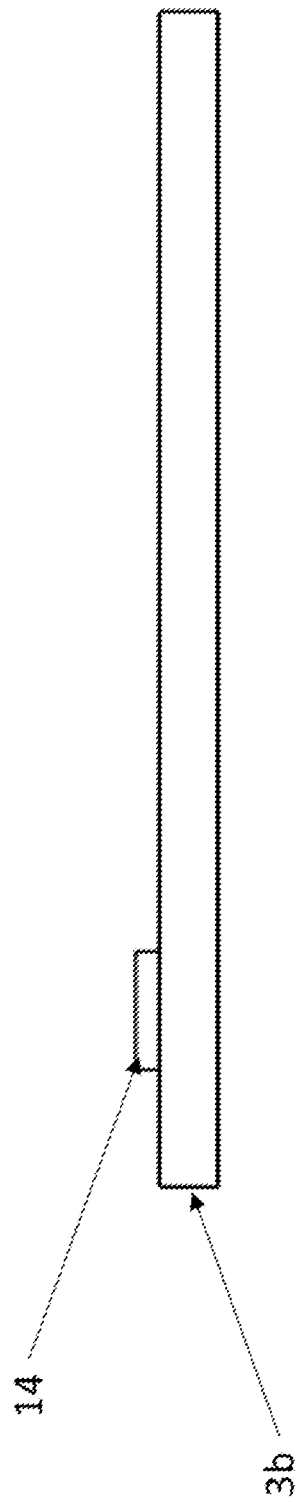
FIG. 14 shows a surface sensor attached to sorbent material.

In other embodiments, a probe (9c) can be placed inside the sorbent material (3b) itself as shown in FIG. 13 or can be placed on as a surface sensor (14) on the surface of the sorbent material (3b) as shown in FIG. 14. While these configurations may be more likely to damage or compromise small areas of the sorbent material, they will also produce more accurate temperature reading of the sorbent material itself without noise from the air temperature or support material temperature. These sensors may be of any geometry or operating principle and may provide any sort of measurement.

While this invention was largely described with respect to its utility for DAC, other uses of the inventions described herein could include application of modular beds with parallel plate sorbent to water filtration, air purification, $CO_2$ removal for life support systems, catalytic reactors, gas mixing, and other similar applications. The modular bed for multi-directional fluid flow could also be expanded to other sorbent types through which fluid can flow in multiple directions such as packed pellet beds. The integration of sensors in the bed can also be generalized to any type of sensor and measurement, e.g., pressure drop across the bed being measured by pressure transducers integrated with the sorbent and/or support structure.

As those skilled in the art will appreciate, numerous modifications and variations of the present invention are possible in light of these teachings, and all such are contemplated hereby. All of the references cited herein are incorporated by reference herein for all purposes, or at least for their teachings in the context presented.

What is claimed is:

1. A modular gas separation tray to accommodate structured sorbent materials for a gas separation process comprising:
    a support structure comprising a set of parallel side wall plates connected by support rods that are communicatively coupled to each of the parallel side wall plates, wherein the support rods are oriented perpendicular to each of the parallel side wall plates or are oriented at non-orthogonal angles in a crossover fashion to each of the parallel side wall plates, and
    wherein the support rods are beams or poles; and
    a sorbent bed comprising multiple layers of structured sorbent in a parallel plate arrangement, through which fluid flows in at least two perpendicular directions.

2. The tray of claim 1 further comprising:
    a baffle extending between the parallel side wall plates to prevent fluid from bypassing the sorbent bed by passing between boundaries of the sorbent bed and the tray.

3. The tray of claim 1, wherein the set of parallel side wall plates are at least one of the group of corrugated sheets, perforated sheets, perforated plates, solid sheets, solid plates, and mesh to reduce parasitic thermal mass.

4. The tray of claim 1, wherein the parallel sorbent plates allow the fluid to flow through the thickness of the parallel plate sorbent in a side-to-side direction.

5. The tray of claim 1, wherein the support rods are oriented perpendicular to each of the parallel side wall plates.

6. The tray of claim 1, wherein the support rods are oriented at non-orthogonal angles in a crossover fashion to each of the parallel side wall plates.

7. The tray of claim 1, wherein steam is flowed in one of the at least two perpendicular directions and air is flowed in the other of the at least two perpendicular directions.

8. The tray of claim 1 further comprising:
    an integrated sensor in the sorbent bed to capture performance characteristics of at least one of the group of a reactor, a steam injection process, a vacuum cooling process, the sorbent bed, and a method of capturing carbon dioxide from ambient air.

9. The tray of claim 8, wherein the integrated sensor is a temperature sensor that captures performance characteristics of the sorbent bed that includes a temperature of the sorbent bed.

10. The tray of claim 8, wherein the integrated sensor is a finned sensor to reduce flow bypassing the sensor bed.

11. The tray of claim 8, wherein the integrated sensor is a surface sensor attached to the sorbent material.

12. The tray of claim 8, wherein the integrated sensor is a probe sensor inserted into the sorbent material.

13. The tray of claim 8, further comprising:
    a channel for receiving the integrated sensor and for supporting the integrated sensor along its length.

14. The tray of claim 1, wherein the gas separation includes ambient air as an input gas and $CO_2$ as a separated gas.

15. The tray of claim 1, wherein the tray is joined with additional trays to create a plurality of trays.

16. The tray of claim 15, wherein the tray includes a joining structure on at least one of the group of a top of the tray, a bottom of the tray, and a side of the tray, wherein the joining structure is communicatively coupled to a corresponding receiving structure on an additional tray to create the plurality of trays.

17. The tray of claim 15, further comprising:
    a baffle extending between the parallel side walls to prevent fluid from bypassing between the plurality of trays.

18. The tray of claim 1, further comprising:
    a sensor configured to measure performance characteristics in the modular gas separation tray, wherein the sensor is provided between adjacent parallel plates of the sorbent bed.

* * * * *